(12) United States Patent
Mutou et al.

(10) Patent No.: US 6,433,803 B2
(45) Date of Patent: Aug. 13, 2002

(54) EXPOSURE APPARATUS FOR IMAGE FORMATION AND IMAGE FORMATION METHOD

(75) Inventors: Yoshinori Mutou, Kitakatsuragai-gun; Tetsuro Toyoshima, Soraku-gun; Tadashi Iwamatsu, Nara; Nobuyuki Azuma, Ibaraki; Yoshinori Nakajima, Joyo, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/826,199

(22) Filed: Apr. 4, 2001

(30) Foreign Application Priority Data

Apr. 7, 2000  (JP) ........................................ 2000-107058

(51) Int. Cl.⁷ .......................... B41J 2/385; G03G 13/04; G03G 15/04
(52) U.S. Cl. ........................ 347/131; 347/132; 347/252; 358/296
(58) Field of Search ............................... 347/131, 130, 347/238, 254, 132, 252; 358/296, 298

(56) References Cited

U.S. PATENT DOCUMENTS 5,115,259 A  *  5/1992  Itoh ........................... 347/131
5,412,408 A  *  5/1995  Itoh et al. .................. 347/132
6,137,518 A  * 10/2000  Maeda ....................... 347/130
6,239,824 B1 *  5/2001  Mutou et al. ............... 347/131

FOREIGN PATENT DOCUMENTS

| JP | 58-152269 |   | 9/1983 |
| JP | 3-4244    | * | 5/1989 |
| JP | 7-61036   |   | 3/1995 |
| JP | 9-85982   |   | 3/1997 |
| JP | 9-277604  | * | 10/1997 |

* cited by examiner

Primary Examiner—Susan S. Y. Lee
(74) Attorney, Agent, or Firm—Dike, Bronstein, Roberts & Cushman IP Group Edwards & Angell, LLP; David G. Conlin; Timothy Carter Pledger (57) ABSTRACT

An exposure apparatus for image formation uses power control means provided to a laser driver for controlling exposure energy and accordingly forming an image. Specifically, exposure energy is varied depending on an isolated-dot pattern and an isolated-line pattern by changing the pulse height (drive power) of a drive pulse for each dot. Both of the isolated-line and isolated-dot patterns of a high resolution can thus be reproduced with a high image quality without increase of cost due to requirements for accuracy in processing and positioning of a lens and without decrease of life of a photoreceptor due to a decreased thickness of its photosensitive layer.

14 Claims, 8 Drawing Sheets

※① ENERGY FOR FORMING ISOLATED LINE
② ENERGY FOR FORMING ISOLATED DOT

※① ENERGY FOR FORMING ISOLATED LINE
② ENERGY FOR FORMING ISOLATED DOT

EXPOSURE APPARATUS FOR IMAGE FORMATION AND IMAGE FORMATION METHOD

BACKGROUND OF THE INVENTION

1. Field of the Invention

The present invention relates to an exposure apparatus for image formation that is applied to an image forming apparatus such as color copying machine and printer for forming an image by means of electrophotography.

2. Description of the Background Art

An image forming apparatus forming an image through electrophotography converts a latent electrostatic image formed on the surface of a photoreceptor in an exposure process into a visible developer image in a subsequent development process. With recent progress in the enhancement of resolution, strong requests have been made to this type of image forming apparatus for a higher image quality as well as a higher reproducibility. Accordingly, various studies and developments as well as a great number of technological innovations have been made regarding the image formation technique over a wide range, for example, retrieval and quantification of parameters contributing to enhancement of the image quality, improvement of image processing technique, improvements of energy modulation and control technique, and the like.

Regarding a technique of forming a latent electrostatic image on the surface of a photoreceptor, an improvement is accomplished by optimizing the spot diameter of an exposure spot on the photoreceptor surface with respect to a dot pitch determined by resolution, and image formation is thus achieved in an improved state.

For example, Japanese Patent No. 2,668,440 discloses a technique employed in an image forming apparatus that uses pulse-width modulation, according to which a halftone image is formed by full-image exposure of pixels and, in order to prevent a drastic change in density due to cross talk of adjacent spots, the maximum spot diameter per pixel is made smaller than the size 0.7 times as large as one pixel size. In this way, halftone is accurately reproduced.

According to a technique disclosed in Japanese Patent Laying-Open No. 7-61036, the spot diameter of an exposure spot is set in a range from 1.0 to 1.3 times a dot pitch and the maximum exposure amount of the exposure spot is set to at least 11 times a luminous sensitivity coefficient on the surface of a photoreceptor. A black image of a large area having a high density and evenness can thus be generated and exposed isolated dots and non-exposed isolated dots are suitably reproduced.

According to a technique disclosed in Japanese Patent Laying-Open No. 58-152269, all pixels are exposed with the spot diameter of an exposure spot that is set to 1.3 to 1.9 times the distance between scan lines. The difference in exposure energy density between the area on a scan line and the area between scan lines is thus decreased to lessen nonuniformity of exposure. A properly reproduced image is accordingly achieved.

According to a technique of forming a latent electrostatic image on the surface of a photoreceptor, the image consisting of a collection of dots, the exposure energy is modulated according to the number of adjacent dots to enable enhancement of image reproducibility with respect to various image data and accordingly a high-quality image can be produced regardless of the type of image data.

For example, according to a technique disclosed in Japanese Patent Laying-Open No. 9-85982 employing a photoreceptor with a high γ-value, an exposure amount for a dot of interest is decreased as the number of dots adjacent horizontally and vertically to the dot of interest increases.

In addition, according to a technique disclosed in Japanese Patent No. 2,839,006 regarding control of binary image data, a pulse width of image data is increased with respect to character data and isolated-dot data in a pseudo halftone region, and the pulse width is decreased with respect to continuous-dot data in the pseudo halftone region so as to achieve clear and smooth characters as well as an excellent tone reproduction.

In order to simultaneously accomplish image reproducibility of an isolated dot and an isolated line in view of enhancement of image quality, the technique disclosed in Japanese Patent No. 2,668,440 could be used to achieve an adequate image reproducibility by performing exposure with an exposure spot diameter smaller than a pixel size without modulating energy. However, as the image density increases, a lens of an expensive material that is precisely processed is required. Further, the lens must be positioned precisely because the depth of focus of an exposure spot is smaller. Resultant problems are a considerable difficulty of the manufacturing technique and an increase of cost caused by a decreased yield.

The techniques disclosed in Japanese Patent Laying-Open No. 7-61036 and Japanese Patent Laying-Open No. 58-152269 could produce an image excellent in reproducibility by means of optimum dot-energy control according to image pattern. However, when the resolution exceeds 1200 dpi, the exposure spot diameter is less than 40 μm. Then, in order to achieve such an exposure spot diameter, a lens must be processed and positioned with a high precision, resulting in increase of cost due to decrease in yield as the problem of the technique disclosed in Japanese Patent No. 2,668,440.

Additionally, the technique disclosed in Japanese Patent Laying-Open No. 9-85982 could adjust the dot diameter with a slight change in light quantity by employing a photoreceptor having a high γ-value. However, in formation of minute dots that is necessary for forming a high-resolution image, this technique is likely to be affected by variation of the dot diameter caused by change in the light quantity, resulting in a problem of difficulty in control of the light quantity.

Further, an image forming apparatus of the electrophotography system generally uses a laser beam with an exposure spot diameter of 60 to 80 μm in an exposure process for forming a latent electrostatic image. This size is three to four times the dot pitch (about 20 μm) for a resolution of 1200 dpi. Then, cross talk between peripheral dots becomes conspicuous resulting in deterioration in image quality.

For example, regarding a periodic line pattern consisting of paired image lines (black lines) and non-image lines (white lines) per pixel, the non-image lines between image lines intended to be formed are not reproduced due to interference of adjacent lines with respect to each other, and a resultant image is solid black as a whole. If the exposure energy of the laser beam is reduced for avoiding this, latent image potential does not attain exposure energy density potential and thus no image is formed.

Similarly, regarding image data having an isolated-dot pattern where no dot is present around a dot of interest and an isolated-line pattern where a plurality of dots continue in one direction, there could occur situations in which the isolated-line pattern can be formed while the isolated-dot pattern cannot be formed and in which the isolated-dot pattern can be formed while the isolated-line pattern has an increased line width. Accordingly, adjustment of exposure energy does not accomplish image reproducibility for both of the isolated-dot pattern and the isolated-line pattern at the same time.

In particular, techniques which have actually been employed frequently reach a result where the isolated-line pattern can be formed while the isolated-dot pattern cannot be produced. Then, in order to achieve an image of a high resolution exceeding 1200 dpi and a high quality by adjustment of exposure spot diameter, an optimum exposure energy should be defined for each pattern. Even if an exposure spot diameter can be obtained that is close to the dot pitch for the resolution of 1200 dpi or higher by reducing the exposure spot diameter, it would be difficult to achieve image reproducibility for both of the isolated-line pattern and the isolated-dot pattern by means of binary exposure energy control.

When a thick photosensitive layer is employed at the surface of a photoreceptor, image reproducibility conspicuously deteriorates. If the photoreceptor uses a thin photosensitive layer for enhancement of image reproducibility, deterioration of dark attenuation characteristics and photosensitive characteristics due to wear as well as increase of residual potential occur in an early stage, resulting in a shorter life. Further, the thin-layer photoreceptor has a relatively low and restricted charge potential on the surface of the photoreceptor, and the potential contrast of a latent electrostatic image deteriorates. Then, tone of sufficient solid-black density and image density cannot be achieved.

SUMMARY OF THE INVENTION

One object of the present invention is to provide an exposure apparatus for image formation capable of achieving image reproducibility with a highimage quality for both of an isolated-line pattern and an isolated-dot pattern of an image having a high resolution of at least 1200 dpi, without causing increase of cost due to requirements for high precision in lens processing and positioning and without shortening life of a photoreceptor due to reduction in the thickness of a photosensitive layer.

An exposure apparatus for image formation and an image formation method according to the invention for achieving the above object relate to an apparatus and a method that use an exposure spot to scan a surface of a photoreceptor to which a predetermined potential of a single polarity is uniformly applied so as to form a latent electrostatic image on the surface. The invention is characterized in that exposure energy of different values is applied respectively to an isolated-dot pattern and an isolated-line pattern of image data, when exposure spot diameter D and dot pitch P have a relation $D>1.4\,P$, the isolated-dot pattern including a dot surrounded by no dot while the isolated-line pattern including a line formed of a plurality of dots arranged continuously in one direction.

According to the invention, when exposure spot diameter D exceeds the value which is 1.4 times as large as dot pitch P, exposure energy of optimum values is applied respectively to the isolated-dot pattern and the isolated-line pattern. Then, without use of a lens processed and positioned precisely or a photoreceptor having its photosensitive layer decreased in its thickness for forming an image of a high resolution, a high-quality image can be reproduced with respect to both of the isolated-line and isolated-dot patterns. Accordingly, an image excellent in reproducibility can be formed without increase of cost and shortening of photoreceptor life.

According to the invention, when exposure spot diameter D and dot pitch P have a relation $D>2.8\,P$, exposure energy Ed applied to the isolated-dot pattern and exposure energy Es applied to the isolated-line pattern are defined as $Ed/Es>3.0$.

In this way, when exposure spot diameter D exceeds the value which is 2.8 times as large as dot pitch P, exposure energy Ed applied to the isolated-dot pattern is set to more than 3 times exposure energy Es applied to the isolated-line pattern. Then, according to the ratio of the exposure spot diameter relative to the dot pitch, optimum exposure energies are applied respectively to the isolated-dot pattern and the isolated-line pattern. Accordingly, without use of a lens processed and positioned precisely or a photoreceptor having its photosensitive layer decreased in its thickness for forming an image of a high resolution, a high-quality image can be reproduced with respect to both of the isolated-line and isolated-dot patterns.

According to the invention, when exposure spot diameter D and dot pitch P have a relation $1.9\,P<D\leq2.8\,P$, exposure energy Ed applied to the isolated-dot pattern and exposure energy Es applied to the isolated-line pattern are defined as $1.5<Ed/Es\leq3.0$.

In this way, when exposure spot diameter D is greater than the value which is 1.9 times dot pitch P and equal to or smaller than the value which is 2.8 times dot pitch P, exposure energy Ed applied to the isolated-dot pattern is set to a value more than 1.5 times exposure energy Es applied to the isolated-line pattern and equal to or less than 3 times exposure energy Es. Depending on the ratio of the exposure spot diameter relative to the dot pitch, optimum exposure energies are applied respectively to the isolated-dot pattern and the isolated-line pattern. Accordingly, without use of a lens processed and positioned precisely or a photoreceptor having its photosensitive layer decreased in its thickness for forming an image of a high resolution, a high-quality image can be reproduced with respect to both of the isolated-line and isolated-dot patterns.

According to the invention, when exposure spot diameter D and dot pitch P have a relation $1.4\,P<D\leq1.9\,P$, exposure energy Ed applied to the isolated-dot pattern and exposure energy Es applied to the isolated-line pattern are defined as $1.0<Ed/Es\leq1.5$.

In this way, when exposure spot diameter D is greater than the value which is 1.4 times dot pitch P and equal to or smaller than the value which is 1.9 times dot pitch P, exposure energy Ed applied to the isolated-dot pattern is set to a value more than 1.0 times exposure energy Es applied to the isolated-line pattern and equal to or less than 1.5 times exposure energy Es. Depending on the ratio of the exposure spot diameter relative to the dot pitch, optimum exposure energies are applied respectively to the isolated-dot pattern and the isolated-line pattern. Accordingly, without use of a lens processed and positioned precisely or a photoreceptor having its photosensitive layer decreased in its thickness for forming an image of a high resolution, a high-quality image can be reproduced with respect to both of the isolated-line and isolated-dot patterns.

According to the invention, preferably the surface of the photoreceptor having at the surface a photosensitive layer of 15 to 25 $\mu$m in thickness is scanned by the exposure spot. The thickness of the photosensitive layer at the surface of the photoreceptor can thus be defined to prevent a considerable shortening of the life of the photosensitive layer and thus extend the life of the photoreceptor.

According to a preferred embodiment of the invention, power control is conducted by changing, according to image patterns, pulse height of a drive pulse supplied to a light source for each dot. By this power control, a drive pulse with its height controlled according to an image pattern to be formed is supplied to the light source. Then, the light source is driven by optimum drive energies respectively for the isolated-dot pattern and the isolated-line pattern. Consequently, respective exposure energies optimum for the isolated-dot and isolated-line patterns are applied.

According to a preferred embodiment of the invention, the width of a drive pulse supplied to the light source for each dot is controlled according to image patterns. By this pulse-width control, a drive pulse with its width controlled according to an image pattern to be formed is supplied to the light source. The light source is thus driven by optimum drive energies respectively for the isolated-dot pattern and the isolated-line pattern. Consequently, respective exposure energies optimum for the isolated-dot and isolated-line patterns are applied.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention are hereinafter described in conjunction with the drawings. An experiment was conducted on an exposure apparatus for image formation according to one embodiment of the present invention, using an image formation process unit 10 shown in FIG. 1. An exposure apparatus 1 is provided between a charger 12 and a development unit 13 along the perimeter of a photoreceptor drum 11 that rotates in direction A represented by the arrow in FIG. 1, and a charging process, an exposure process and a development process are successively carried out on the surface of photoreceptor drum 11 by image formation process unit 10.

Figure 1:
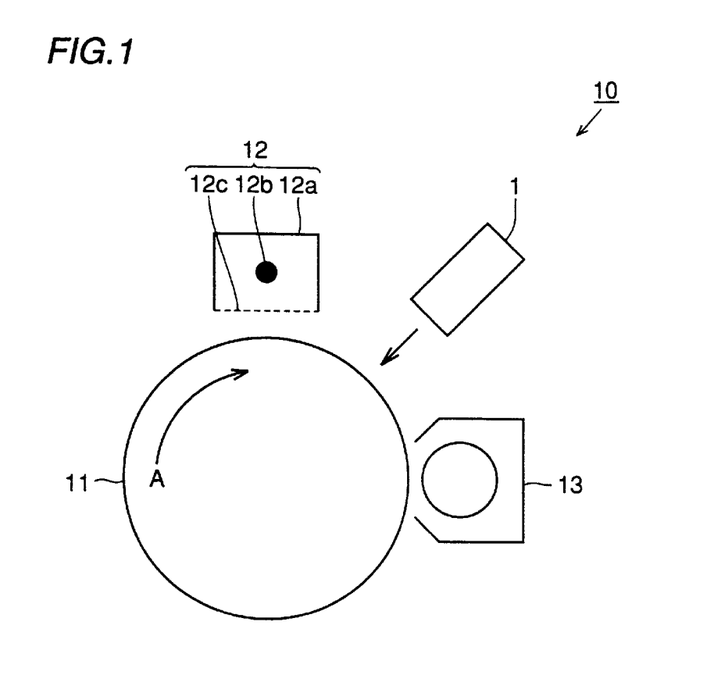
FIG. 1 shows a structure of an image formation process unit used for an experiment on an exposure apparatus for image formation according to one embodiment of the present invention.

Photoreceptor drum 11 includes a photosensitive layer formed of an undercoat layer (UCL), a charge generation layer (CGL) and a charge transport layer (CTL) deposited in this order on a cylindrical base made of a conductive material such as aluminum. The photoreceptor drum is a laminated type organic photoreceptor having a photosensitive layer with its surface negatively charged. Charger 12 includes a casing 12a, a wire 12b and a grid 12c each connected to a high-voltage power supply. Grid 12c is arranged with a distance of approximately 1 to 2 mm from the surface of photoreceptor drum 11. The amount of charges generated by corona discharge, released from wire 12b and subsequently arriving at the surface of photoreceptor drum 11 is controlled by a bias voltage applied to grid 12c in order to charge the surface of photoreceptor drum 11 to a desired surface potential.

Figure 2:
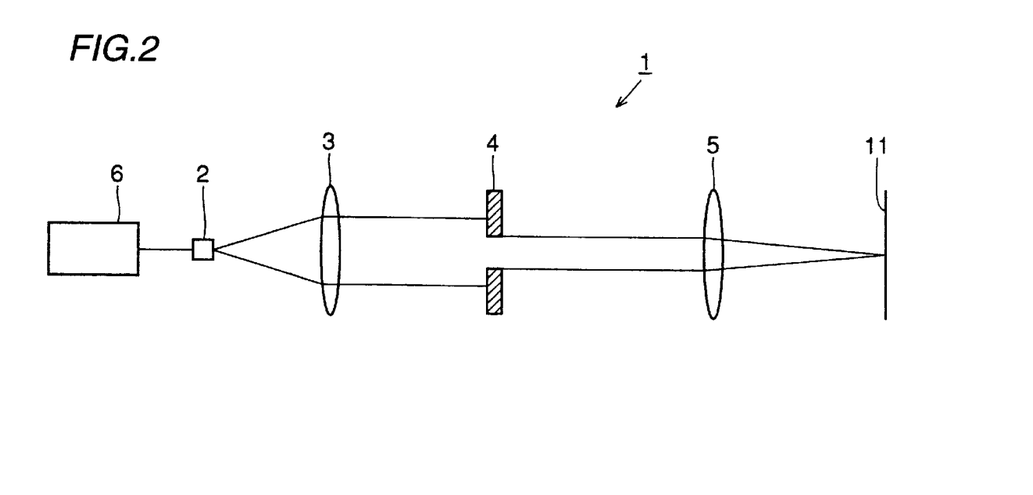
FIG. 2 is a schematic view showing a structure of the exposure apparatus in the image formation process unit shown in FIG. 1.

Referring to FIG. 2, exposure apparatus 1 includes an infrared semiconductor laser 2 (hereinafter LD 2) with a wavelength of 780 nm as a light source, a collimator lens 3, an aperture 4 and an objective lens 5. A laser beam emitted from LD 2 is converted into a parallel beam by collimator lens 3 and shaped by aperture 4 to generate a spot with a desired exposure spot diameter so as to form an image on the surface of photoreceptor drum 11 by objective lens 5. LD 2 is driven with a predetermined power by a well-known laser driver 6 (manufactured by KINO MELLES GRIOT CORPORATION for example) and its ON/OFF is controlled with a predetermined pulse width. The laser beam emitted from exposure apparatus 1 irradiates the surface of photoreceptor drum 11 charged to a predetermined surface potential, and accordingly a latent electrostatic image is formed on the surface of photoreceptor drum 11 through photoconduction in the photosensitive layer.

Figure 3:
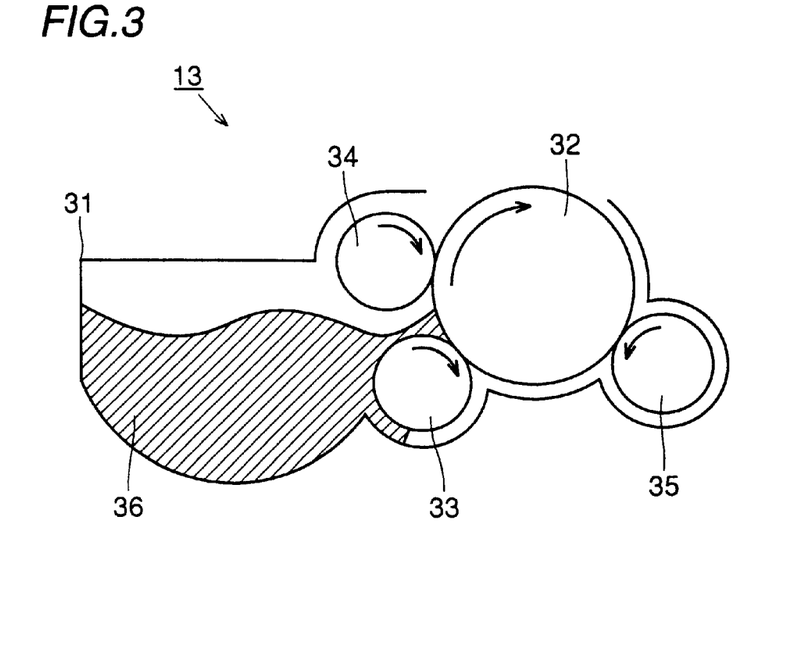
FIG. 3 is a cross section showing a structure of a development unit in the image formation process unit shown in FIG. 1.

Referring to FIG. 3, development unit 13 includes a container 31 holding one-component developer 36 therein and further includes a development roller 32, a supply roller 33, a doctor roller 34 and a collection roller 35 each supported rotatably on an axis. Developer 36 in container 31 is conveyed by supply roller 33 onto the surface of development roller 32 to be held by doctor roller 34 on the surface of development roller 32 with a predetermined layer thickness. The surface of development roller 32 passing the position opposing doctor roller 34 then faces the surface of photoreceptor drum 11. Developer 36 held on the surface of development roller 32 thus electrostatically adheres to the electrostatic latent image on photoreceptor drum 11. Consequently, a developer image is formed.

Developer 36 held on the surface of development roller 32 is charged with the same polarity as that of the charge potential on the surface of photoreceptor drum 11. A bias voltage is applied to development roller 32 that is controlled to allow, when the potential of the latent electrostatic image formed on the surface of photoreceptor drum 11 ranges from a half of the charge potential of the photoreceptor drum 11 to 0, developer 36 held on development roller 32 to electrostatically adhere to the surface of photoreceptor drum 11. The surface of development roller 32 passing the position facing the surface of photoreceptor drum 11 then faces the surface of collection roller 35, and accordingly developer 36 remaining on the surface of development roller 32 is collected into container 31.

Figure 4:
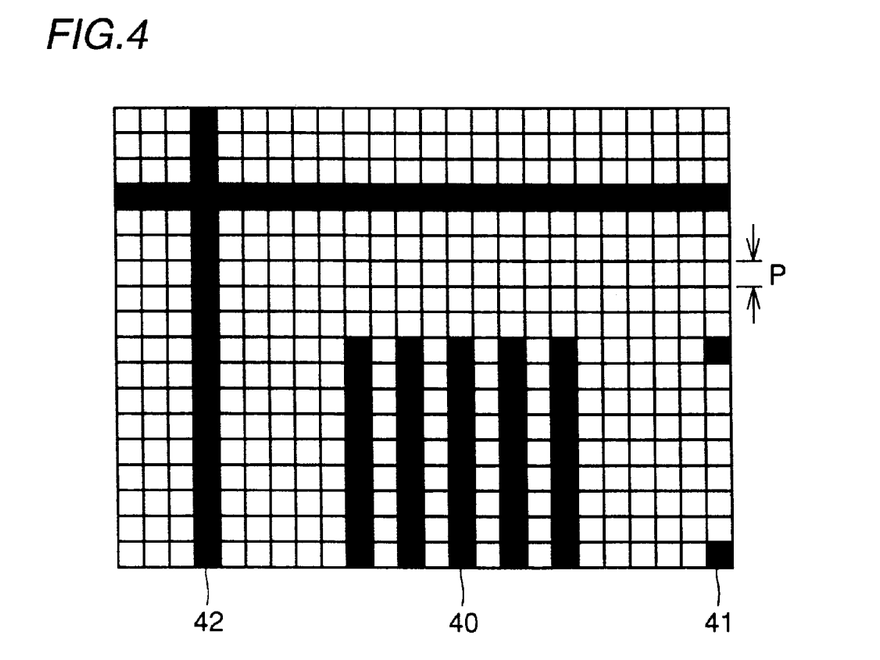
FIG. 4 shows an image pattern formed by the image formation process unit shown in FIG. 1.

Image formation process unit 10 having the structure as discussed above was used for an experiment to observe image reproducibility with respect to image patterns formed as shown in FIG. 4, i.e., a periodic-line pattern 40, an isolated-dot pattern 41 and an isolated-line pattern 42. These patterns were formed with a margin of 6 P between patterns for avoiding cross talk between exposure spots of respective image patterns, and periodic line pattern 40 was formed with lines each having width P that are arranged at intervals of 2 P. A developer image of each image pattern formed on the surface of photoreceptor drum 11 was stripped therefrom by means of an adhesive tape, transferred, and enlarged by a microscope for evaluation. Respective proper sizes of the diameter of an isolated dot and the line width were both √2 times dot pitch P. Results of the experiment are described below.

Figure 5A:
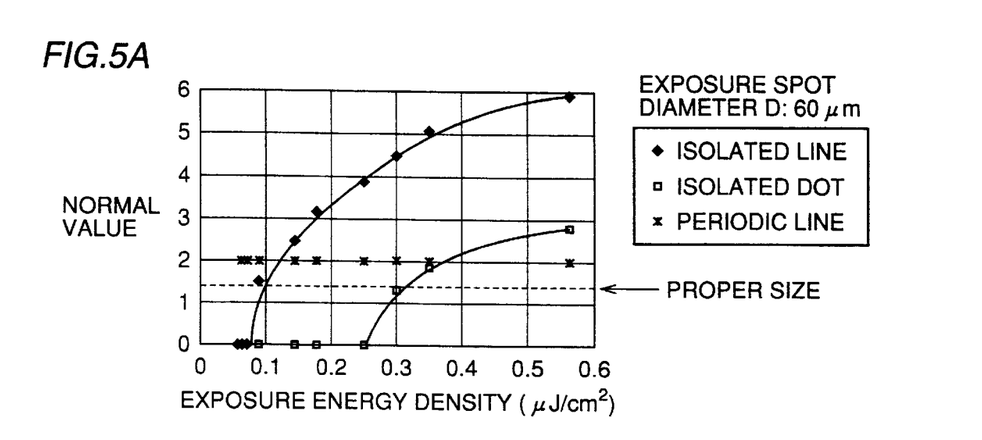
FIGS. 5A to 5C show a relation between an exposure energy density and a normal value with respect to the image pattern formed by the image formation process unit shown in FIG. 1, respectively corresponding to exposure spot diameters of 60 μm, 40 μm and 30 μm.
Figure 5B:
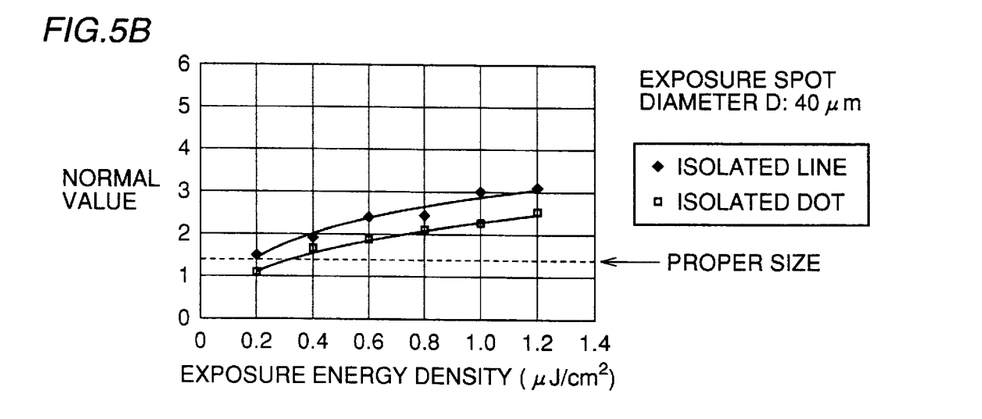
Figure 5C:
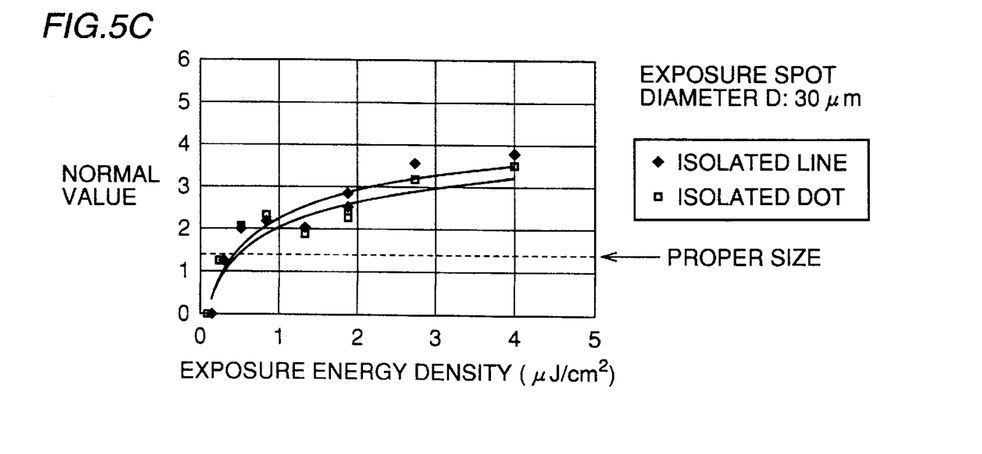
Figure 6:
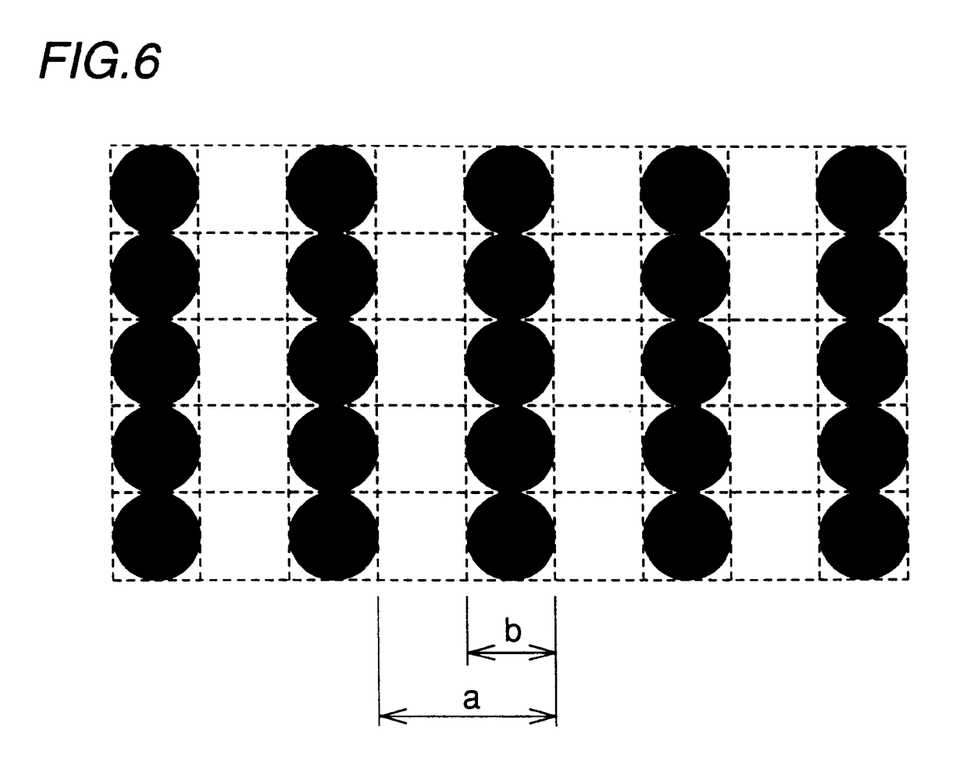
FIG. 6 is provided for explanation of a method of calculating a normal value for a periodic line pattern.

FIGS. 5A to 5C correspond respectively to exposure spot diameters D of 60 μm, 40 μm and 30 μm. Photoreceptor drum 11 having its photosensitive layer of 20 μm in thickness was used to form an image with a resolution of 1200 dpi by using a varied exposure energy density ($\mu J/cm^2$). Resultant images have respective states as shown in FIGS. 5A to 5C. Normal values indicated on the axis of abscissas shown in FIGS. 5A to 5C were determined, relative to the periodic line pattern, by defining a normal value as "1" with respect to the ratio of 50% of line width b to interval a of lines (duty ratio) as shown in FIG. 6, and relative to the isolated-dot pattern and the isolated-line pattern, by defining a normal value as "1" with respect to the dot diameter and the line width equal to pixel pitch P.

As shown in FIG. 5A, when exposure spot diameter D is 60 μm and equal to 2.8 P, normal value of only "0" or "2" (duty ratio is 0% or 100%) occurs regarding the periodic line pattern. It is thus impossible to produce a periodic line pattern having an intermediate duty ratio. Namely, no image is formed or a resultant image is solid black.

Figure 7A:
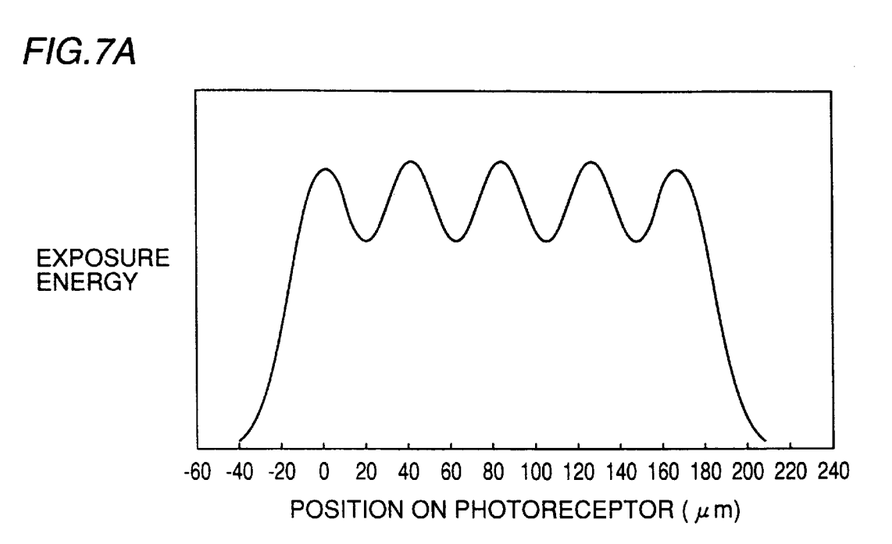
FIG. 7A shows an exposure energy distribution in the direction orthogonal to the line direction of the periodic line pattern formed by the image formation process unit shown in FIG. 1.

More specifically, exposure energy has a distribution as shown in FIG. 7A in the direction orthogonal to the line direction of a periodic line pattern formed under the above-described conditions. It is understood from FIG. 7A that, supposing that the potential of a latent electrostatic image varies in accordance with change of the exposure energy value, the latent image potential contrast of the periodic line pattern (difference between a value of a white line of the periodic line pattern and a peak value of the periodic line pattern) is merely 28% relative to the latent image potential contrast of 100% obtained when exposure spots do not overlap each other. A reason for this is that the latent image potential in the direction orthogonal to the line direction is rendered uniform by being significantly affected by cross talk between exposure spots of adjacent lines in the periodic line pattern.

Figure 7B:
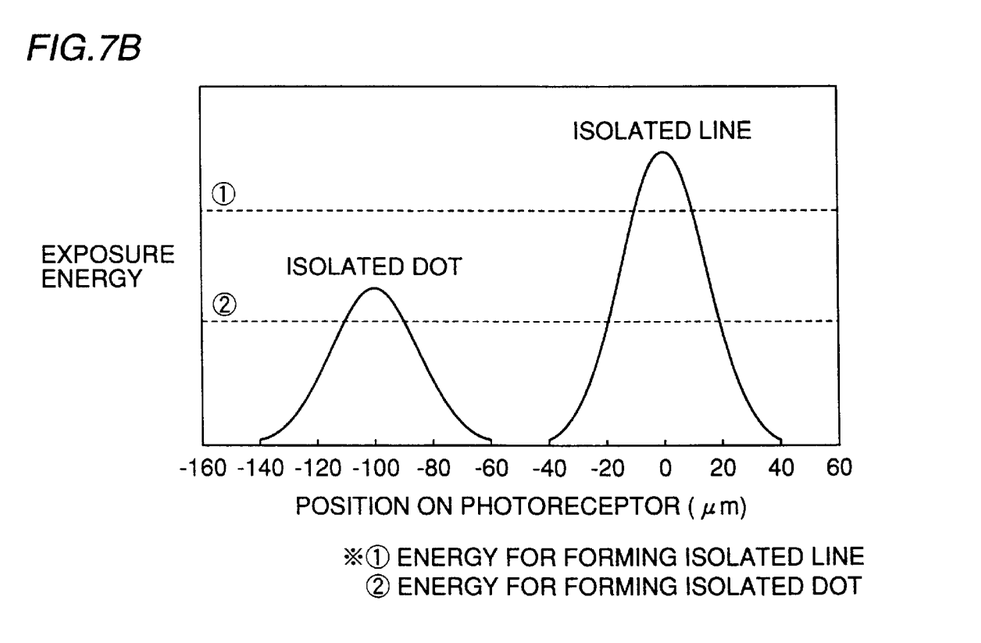
FIG. 7B shows an exposure energy distribution of an isolated-dot pattern and an isolated-line pattern.

On the other hand, the isolated-dot and isolated-line patterns can be formed with respective proper sizes (12 times pixel pitch P). However, when an isolated-line pattern formed of isolated-dot patterns continuing in one direction is formed, influence of cross talk between adjacent dots causes a considerable difference in the latent image potential between the isolated-line pattern and the isolated-dot pattern as shown in FIG. 7B. Resultant phenomena are that an exposure energy forming an isolated-line pattern of a desired size could not form an isolated-dot pattern of a desired size and that an exposure energy forming an isolated-dot pattern of a desired size could produce an isolated-line pattern with an increased line width. These isolated-line and isolated-dot patterns are basic image patterns constituting various images. Therefore, such phenomena could be a chief cause of image-quality deterioration.

In order to prevent these phenomena and maintain a high image quality, a high image reproducibility is required with respect to both of the isolated-line pattern and the isolated-dot pattern and thus an appropriate exposure energy must be applied to each image pattern. As clearly seen from FIG. 5A, when exposure spot diameter D is 2.8 times dot pitch P, the exposure energy density for producing an isolated-line pattern of a proper size is approximately 0.1 $\mu J/cm^2$ and that for producing an isolated-dot pattern of a proper size is approximately 0.3 $\mu J/cm^2$. In view of this, it would be possible to achieve a high image reproducibility for both of the isolated-line pattern and the isolated-dot pattern by applying an exposure energy to the isolated-dot pattern that is three times an exposure energy density applied to isolated-line pattern.

Figure 8A:
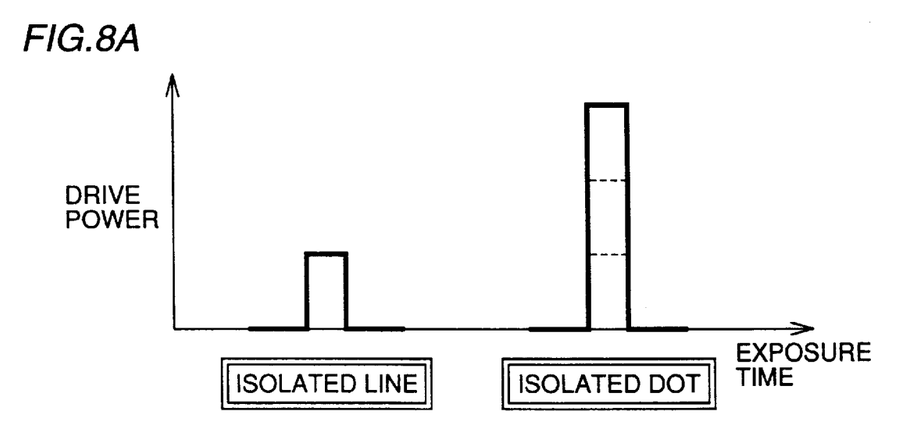
FIGS. 8A and 8B show a waveform of a drive pulse supplied to an LD in the image formation process unit shown in FIG. 1, FIG. 8A corresponding to pulse-height modulation with the pulse width kept constant and FIG. 8B corresponding to pulse-width modulation with the pulse height kept constant.

Then, as shown in FIG. 8A, the pulse height (drive power) of a drive pulse for each dot was changed depending on the image patterns by using power control means provided to laser driver 6. In this way, drive energy supplied from laser driver 6 to LD 2 was controlled according to an image pattern so as to form an image. Consequently, reproducibility could be enhanced for an isolated-dot pattern with a resolution of 1200 dpi having a dot diameter of approximately 30 μm and an enhanced reproducibility is also achieved for an isolated-line pattern. The power control means controlling the pulse height of a drive pulse per dot could be employed to accomplish image reproducibility for both of the isolated-dot pattern and the isolated-line pattern simultaneously.

The discussion above refers to photoreceptor drum 11 having its photosensitive layer of 20 μm in thickness for forming an image with a resolution of 1200 dpi. A superior image reproducibility could also be achieved for both of the isolated-dot pattern and the isolated-line pattern by using photoreceptor drum 11 having its photosensitive layer of 15 μm or 25 μm in thickness and applying the same exposure energy ratio as employed for the photosensitive layer of 20 μm in thickness.

Figure 9:
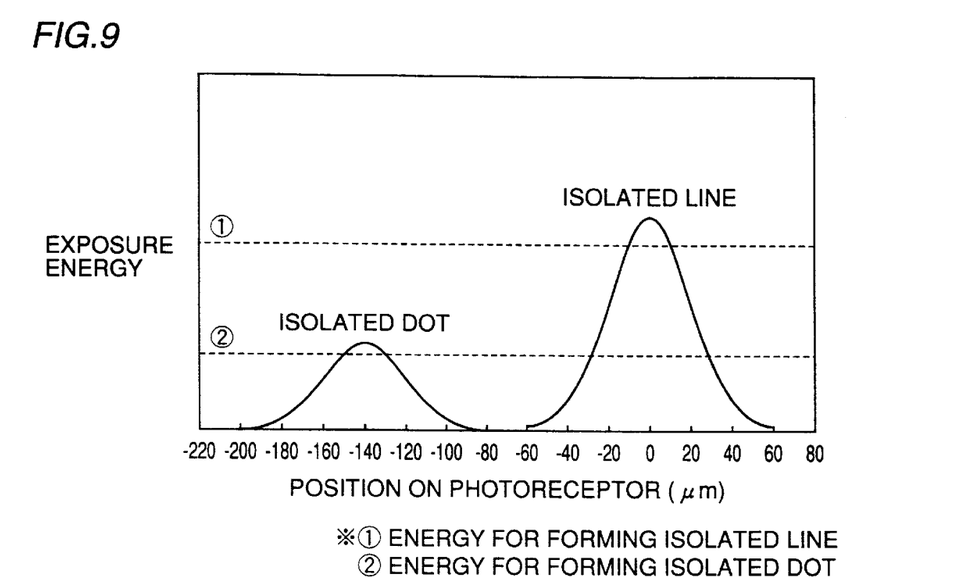
FIG. 9 shows exposure energy for each image pattern formed by the image formation process unit shown in FIG. 1.

When exposure spot diameter D is 3.8 P, i.e., 80 μm, there was an increased difference in the latent image potential between the isolated-dot pattern and the isolated-line pattern as shown in FIG. 9 compared with that when exposure spot diameter D is 2.8 P. Then, for spot diameter D of 3.8 P, exposure energy supplied to LD 2 for forming an image of the isolated-dot pattern was defined as an energy three times or higher the exposure energy supplied for forming an image of the isolated-line pattern. Accordingly, a high image reproducibility could be achieved for both of the isolated-dot and isolated-line patterns. It is accordingly understood that when D is greater than 2.8 P, exposure energy Ed applied to the isolated-dot pattern and exposure energy Es applied to the isolated-line pattern should be defined as Ed/Es>3.0.

When exposure spot diameter D is 1.9 P, i.e., 40 μm as shown in FIG. 5B, an exposure energy of 0.3 $\mu J/cm^2$ and that of 0.2 $\mu J/cm^2$ can be supplied respectively for the isolated-dot pattern and the isolated-line pattern to form images of respective proper sizes. Data obtained regarding exposure spot diameter D equal to 2.8 P can be taken into consideration to achieve a high image reproducibility for both of the isolated-dot and isolated-line patterns, when exposure spot diameter D is in a range expressed by 1.9 P<D≦2.8 P, by employing Ed/Es in a range expressed by 1.5<Ed/Es≦3.0.

When exposure spot diameter D is 1.4 P, i.e., 30 $\mu$m, as shown in FIG. 5C, exposure energy of 0.4 $\mu J/cm^2$ can be supplied for both of the isolated-dot and isolated-line patterns to form images of respective proper sizes, which means that no change is necessary of exposure energy depending on the image patterns. Data obtained regarding exposure spot diameter D of 1.9 P can be taken into consideration to achieve an excellent image reproducibility for both of the isolated-dot and isolated-line patterns, when D is in a range expressed by 1.4 P<D≦1.9 P by setting Ed/Es in a range expressed by 1.0<Ed/s≦1.5.

Figure 10:
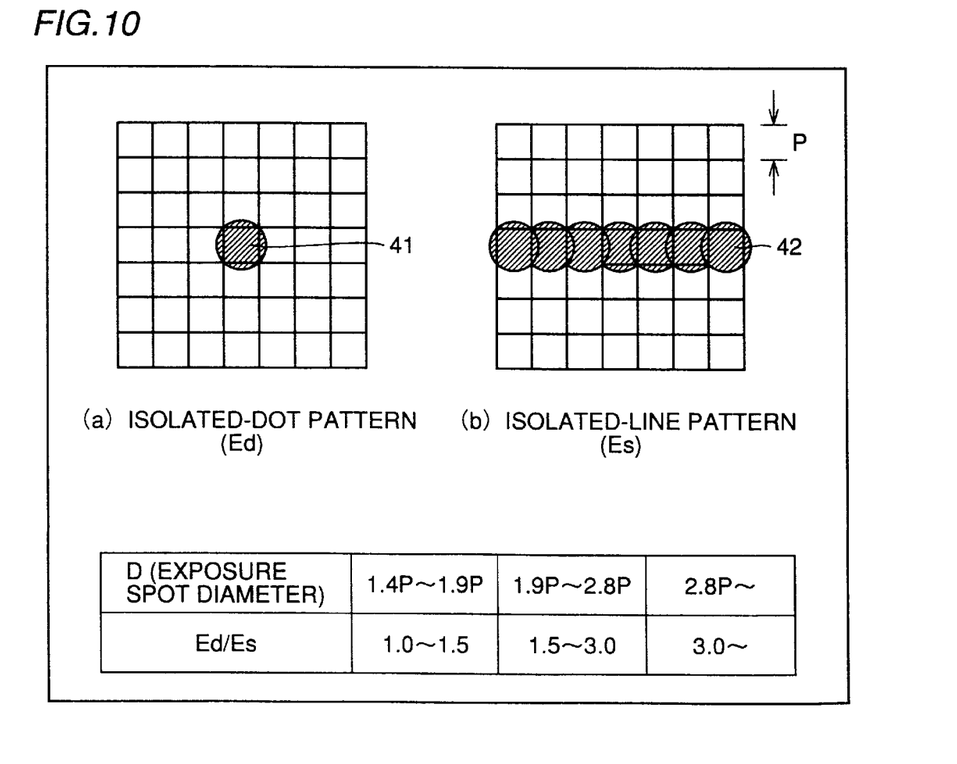
FIG. 10 shows a relation between an exposure spot diameter and exposure energy ratio based on an experimental result obtained by using the image formation process unit shown in FIG. 1.

FIG. 10 shows a resultant relation between exposure energy Ed to be applied to the isolated-dot pattern and exposure energy Es to be applied to the isolated-line pattern with respect to spot diameter D which is varied.

Figure 11A:
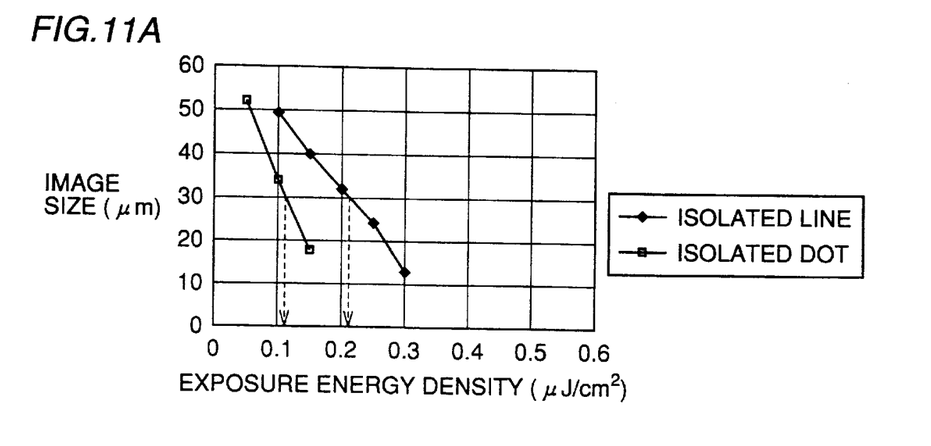
FIGS. 11A to 11C show a relation between an image size and exposure energy density determined through simulation by using the image formation process unit shown in FIG. 1, FIGS. 11A to 11C corresponding respectively to spot diameters D of 60 μm, 40 μm and 30 μm.
Figure 11B:
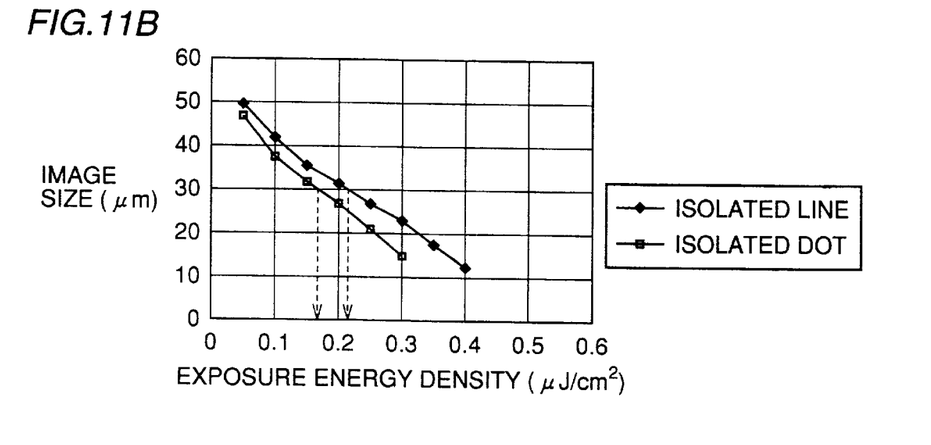
Figure 11C:
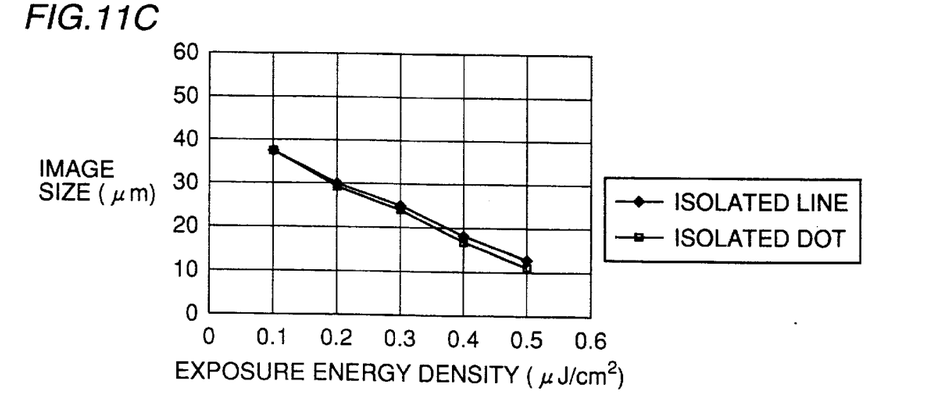

FIGS. 11A to 11C show a relation, which is determined through analytical simulation, between an exposure energy density and an image size (dot diameter, line width) when the exposure spot diameter is changed. Referring to FIG. 11A, when an image pattern with a resolution of 1200 dpi is formed by using exposure spot diameter D equal to 60 $\mu$m (2.8 P), an exposure energy density for achieving a proper image size 30 $\mu$m for the isolated-dot pattern is 0.12 $\mu J/cm^2$ and that for the isolated-line pattern is 0.22 $\mu J/cm^2$. The exposure energy must be controlled by setting Ed/Es to approximately 1.8 in order to produce both of the isolated-dot and isolated-line patterns with respective proper sizes.

Referring to FIG. 11B, when an image pattern of a resolution 1200 dpi is formed by using exposure spot diameter D equal to 40 $\mu$m (1.9 P), an exposure energy density for achieving a proper image size 30 $\mu$m is 0.17 $\mu J/cm^2$ for the isolated-dot pattern and that for the isolated-line pattern is 0.22 $\mu J/cm^2$. Therefore, the exposure energy must be controlled for generating the isolated-dot pattern and the isolated-line pattern both with proper image sizes respectively by setting Ed/Es to approximately 1.3.

Further, referring to FIG. 11C, when an image pattern of a resolution 1200 dpi is formed by using exposure spot diameter D equal to 30 $\mu$m (1.4 P), an exposure energy density for accomplishing a proper image size 30 $\mu$m is 0.2 $\mu J/cm^2$ for both of the isolated-dot and isolated-line patterns. Then no exposure energy control is required for producing both of the isolated-dot and isolated-line patterns with proper image sizes respectively.

It is clearly seen from the results shown in FIGS. 11A to 11C that, when exposure spot diameter D is in a range exceeding 1.4 P, an exposure energy fixed at a certain value cannot produce a high image reproducibility for both of the isolated-dot and isolated-line patterns. The exposure energy should thus be changed depending on image patterns.

However, the exposure energy ratio (Ed/Es) with respect to the isolated-dot pattern and the isolated-line pattern determined through the experiment does not necessarily coincide with an exposure energy ratio for an actual image formation. A possible reason is that no consideration is taken for the thickness of the CTL of photoreceptor drum 11 in the present experiment. Therefore, if a photoreceptor drum having a thinner CTL is employed in the experiment, a latent electrostatic image can more accurately be formed through an exposure process with less diffusion of carriers. Consequently, an experimental result would match the exposure energy ratio in an actual image formation.

Figure 8B:
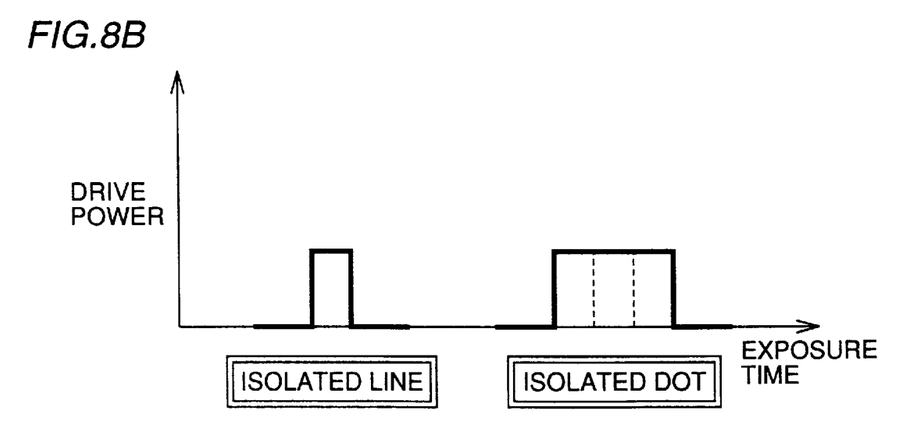

In the experiment herein discussed, the exposure energy is controlled by keeping constant the exposure time (pulse width of a drive pulse supplied to LD 2) and varying the exposure power (pulse height of the drive pulse) (power control method). Alternatively, the exposure power may be fixed while the exposure time may be varied, i.e., pulse-width control method may be employed, or another control method by which both of the exposure time and exposure power are varied may also be used. FIG. 8B shows a waveform of a drive pulse applied to LD 2 for setting exposure energy ratio to 3 by means of pulse modulation method with a constant exposure power.

The experiment discussed above is conducted by employing an image formation process through which a latent electrostatic image is made visible by means of one-component development method. However, a similar result would be accomplished when a two-component development method or jumping development method is applied to a development process to form an image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An exposure apparatus for image formation using an exposure spot for scanning a surface of a photoreceptor, a predetermined potential of a single polarity uniformly applied to the surface, to form a latent electrostatic image on the surface of the photoreceptor, said exposure apparatus having a function of applying exposure energy of different values respectively to an isolated-dot pattern and an isolated-line pattern of image data when exposure spot diameter D and dot pitch P have a relation D>1.4 P, said isolated-dot pattern including a dot surrounded by no dot and said isolated-line pattern including a line formed of a plurality of dots arranged continuously in one direction.

2. The exposure apparatus for image formation according to claim 1, having a function of defining exposure energy Ed applied to the isolated-dot pattern and exposure energy Es applied to the isolated-line pattern as Ed/Es>3.0 when exposure spot diameter D and dot pitch P have a relation D>2.8 P.

3. The exposure apparatus for image formation according to claim 1, having a function of defining exposure energy Ed applied to the isolated-dot pattern and exposure energy Es applied to the isolated-line pattern as 1.5<Ed/Es≦3.0 when exposure spot diameter D and dot pitch P have a relation 1.9 P<D≦2.8 P.

4. The exposure apparatus for image formation according to claim 1, having a function of defining exposure energy Ed applied to the isolated-dot pattern and exposure energy Es applied to the isolated-line pattern as 1.0<Ed/Es≦1.5 when exposure spot diameter D and dot pitch P have a relation 1.4 P<D≦1.9 P.

5. The exposure apparatus for image formation according to claim 1, having a function of scanning by using the exposure spot the surface of the photoreceptor having at the surface a photosensitive layer of 15 to 25 $\mu$m in thickness.

6. The exposure apparatus for image formation according to claim 1, having a power control function of changing, according to image patterns, pulse height of a drive pulse supplied to a light source for each dot.

7. The exposure apparatus for image formation according to claim 1, having a pulse-width control function of controlling, according to image patterns, pulse width of a drive pulse supplied to a light source for each dot.

8. An image formation method forming an image by using an exposure spot for scanning a surface of a photoreceptor, a predetermined potential of a single polarity uniformly applied to the surface, to form a latent electrostatic image on the surface of the photoreceptor, exposure energy of different values being applied respectively to an isolated-dot pattern and an isolated-line pattern of image data when exposure spot diameter D and dot pitch P have a relation D>1.4 P, said isolated-dot pattern including a dot surrounded by no dot and said isolated-line pattern including a line formed of a plurality of dots arranged continuously in one direction.

9. The image formation method according to claim 8, exposure energy Ed applied to the isolated-dot pattern and exposure energy Es applied to the isolated-line pattern being defined as Ed/Es>3.0 when exposure spot diameter D and dot pitch P have a relation D>2.8 P.

10. The image formation method according to claim 8, exposure energy Ed applied to the isolated-dot pattern and exposure energy Es applied to the isolated-line pattern being defined as $1.5<Ed/Es \leq 3.0$ when exposure spot diameter D and dot pitch P have a relation 1.9 P<D$\leq$2.8 P.

11. The image formation method according to claim 8, exposure energy Ed applied to the isolated-dot pattern and exposure energy Es applied to the isolated-line pattern being defined as $1.0<Ed/Es \leq 1.5$ when exposure spot diameter D and dot pitch P have a relation 1.4 P<D$\leq$1.9 P.

12. The image formation method according to claim 8, the surface of the photoreceptor having at the surface a photosensitive layer of 15 to 25 $\mu$m in thickness being scanned by the exposure spot.

13. The image formation method according to claim 8, pulse height of a drive pulse supplied to a light source for each dot being changed according to image patterns.

14. The image formation method according to claim 8, pulse width of a drive pulse supplied to a light source for each dot being controlled according to image patterns.

* * * * *